(12) United States Patent
van Dijk et al.

(10) Patent No.: US 10,905,089 B2
(45) Date of Patent: Feb. 2, 2021

(54) MILK METER

(71) Applicant: N.V. Nederlandsche Apparatenfabriek NEDAP, Groenlo (NL)

(72) Inventors: Jeroen Martin van Dijk, Groenlo (NL); Edwin Schäperclaus, Groenlo (NL); Rudie Jan Hendrik Lammers, Groenlo (NL)

(73) Assignee: N.V. NEDERLANDSCHE APPARATENFABRIEK NEDAP, Groenlo (NL)

( * ) Notice: Subject to any disclaimer, the term of this patent is extended or adjusted under 35 U.S.C. 154(b) by 598 days.

(21) Appl. No.: 15/831,645

(22) Filed: Dec. 5, 2017

(65) Prior Publication Data
US 2018/0153129 A1 Jun. 7, 2018

(30) Foreign Application Priority Data
Dec. 5, 2016 (NL) ..................................... 2017924

(51) Int. Cl.
*A01J 5/01* (2006.01)
*G01F 1/52* (2006.01)
*G01F 23/30* (2006.01)
*G01F 23/72* (2006.01)
*G01F 23/68* (2006.01)
*G01F 23/00* (2006.01)

(52) U.S. Cl.
CPC ........ *A01J 5/01* (2013.01); *G01F 1/52* (2013.01); *G01F 23/303* (2013.01); *G01F 23/68* (2013.01); *G01F 23/686* (2013.01); *G01F 23/72* (2013.01)

(58) Field of Classification Search
CPC .... A01J 5/01; G01F 1/52; G01F 23/30; G01F 23/303; G01F 23/64; G01F 23/68; G01F 23/683; G01F 23/686; G01F 23/72
See application file for complete search history.

(56) References Cited

U.S. PATENT DOCUMENTS 5,313,833 A * 5/1994 Hoefelmayr .............. A01J 5/01
                                                              119/14.17
2017/0303496 A1* 10/2017 Fematt .................. A01J 5/0133

FOREIGN PATENT DOCUMENTS

| DE | 32 14 734 A1 | 10/1983 |
|---|---|---|
| EP | 3 155 897 A1 | 4/2017 |
| GB | 212 969 A | 3/1924 |

(Continued)

OTHER PUBLICATIONS

Dutch Search Report, dated Sep. 8, 2017 (10 pages).

*Primary Examiner* — Herbert K Roberts
(74) *Attorney, Agent, or Firm* — Jacobson Holman PLLC (57) ABSTRACT

A milk meter for measuring a flow rate of a milk flow with an inlet and an outlet a liquid flow path from the inlet to the outlet, a stabilization chamber in the liquid flow path and a float in the stabilization chamber configured to float on milk the milk meter is configured so a level of milk in the stabilization chamber depends on the flow rate of the milk flow, and is provided with a magnetic unit in the stabilization chamber, the magnetic field varies in a height direction of the stabilization chamber, an electronic measuring unit is arranged in the float for measuring the strength of the magnetic field, the strength is a measure of the height within the stabilization chamber at which the float is floating on the milk and the strength of the magnetic field is a measure of the flow rate of the milk flow.

21 Claims, 6 Drawing Sheets

(56) References Cited

FOREIGN PATENT DOCUMENTS

| WO | 2004/042329 A1 | 5/2004 | |
|---|---|---|---|
| WO | 2006/135301 A1 | 12/2006 | |
| WO | WO-2010104383 A1 * | 9/2010 | ............... G01F 1/52 |

* cited by examiner

MILK METER

BACKGROUND OF THE INVENTION

The invention relates to a milk meter for measuring a flow rate of a milk flow, provided with an inlet to which, in use, the milk flow is supplied, an outlet where the milk flow leaves the milk meter, in use, and a liquid flow path extending from the inlet to the outlet.

Such milk meters, of diverse types, are known. Many known milk meters are mechanical fill and dump meters, which contain moving parts.

A drawback of such mechanical milk meters is that the moving parts are subject to wear and require maintenance, and further are susceptible to pollution. The invention contemplates the provision of a milk meter that contains an improvement over known milk meters.

SUMMARY OF THE INVENTION

The milk meter according to the invention is characterized in that the milk meter is provided with a stabilization chamber which is included in the liquid flow path and a float which is in the stabilization chamber and is configured to float on milk of the milk flow that is in the stabilization chamber, wherein the milk meter is configured such that a level of milk in the stabilization chamber depends on the flow rate of the milk flow, wherein the milk meter is provided with a buffer reservoir which is included upstream of the stabilization chamber in the liquid flow path, wherein in a sidewall of the buffer reservoir an outflow opening is provided which extends from a lowest point of the outflow opening upwardly and which is in fluid communication with the outlet, wherein a top of the buffer reservoir comprises an inlet opening which is in fluid communication with the inlet, and wherein the buffer reservoir and the stabilization chamber are connected with each other via a fluid connection, such that the buffer reservoir, the fluid connection and the stabilization chamber, in use, function as communicating vessels so that, in use, a level of the milk in the stabilization chamber is equal to a level of the milk in the buffer reservoir, wherein the milk meter is furthermore provided with at least one sensor device for determining the flow rate of the milk flow through the milk meter, and wherein the milk meter is further provided with an outflow channel, wherein the outflow opening is in fluid communication with the outlet via the outflow channel, wherein the outflow channel is in the milk meter next to the stabilization chamber.

An advantage of the milk meter according to the invention is that the moving float in combination with the buffer reservoir makes a very accurate measurement of the flow rate of the milk flow possible. Sloshing of the milk in the buffer reservoir is hardly, if at all, experienced by the float, so that the level of the milk and/or the float in the stabilization chamber is an accurate measure of the flow rate of the milk flow.

Preferably, it holds that the outflow channel and the stabilization chamber are in the buffer reservoir together, more particularly that the buffer reservoir extends around the stabilization chamber and that the buffer reservoir extends around the outflow channel. In this manner, a milk meter is realized that is practical to manufacture and maintain (clean). Preferably, it holds that the outflow channel and the stabilization chamber are separated at a distance from each other. Also, it holds, preferably, that such distance extends in a direction of a liquid surface of the milk that is in the buffer reservoir in use, that is, in a horizontal direction.

The sensor device may be configured to measure the height of the level of the milk in the stabilization chamber, the measured height of the level of the milk being a measure of the flow rate of the milk flow. To this end, the sensor device is for instance provided with at least one sensor, such as an optical sensor, to measure the height of the level of the milk in the stabilization chamber. Also, the sensor device may be configured to measure the height at which the float is floating on the milk in the stabilization chamber, the measured height of the float being a measure of the flow rate of the milk flow. To this end, the sensor device is for instance provided with at least one sensor, such as an optical sensor, to measure the height at which the float is within the stabilization chamber.

In particular, it holds that the sensor device is arranged in or on the float, wherein the sensor device comprises an electronic measuring unit for contactlessly measuring the height within the stabilization chamber at which the float is floating on the milk in the stabilization chamber, the measured height being a measure of the flow rate of the milk flow, and wherein the electronic measuring unit is provided with a transmitter unit for wirelessly emitting a signal which comprises information about the measured flow rate of the milk flow.

A further advantage of the moving float is that it is not subject to wear because measuring is done contactlessly and the obtained information about the flow rate is emitted wirelessly. The ability to transmit information about the measured flow rate wirelessly moreover provides the advantage that a lot of cable can be saved. In large cow houses this can easily run up to kilometers of cable. This is because an udder of the cow has to be freely accessible, which is why cables are mostly diverted along a direction of a path along which the cows walk in the milking parlor, so that the cows cannot come into contact with the cables. A further disadvantage of the use of cables is that they are typically provided with connectors which are sensitive to moisture. Especially a milking parlor is particularly moist. This makes it particularly advantageous when the electronic measuring unit is provided with a transmitter unit as has been indicated above.

A further advantage is that the vulnerable electronic measuring unit is included in the float and hence can be well protected from contamination and other interactions with, for example, objects from outside of the milk meter. Moreover, it appears that in this manner the flow rate of the milk flow can be determined very accurately. A reason for this is that the float lowers through foam floating on the milk. As a result, a measurement is performed where the foam does not introduce any inaccuracy in the measurement. As the electronic measuring unit is in the float, the weight of a float can be kept small. Consequently, the float itself can also be kept small. In particular, it holds that the milk meter is furthermore provided with a magnetic unit for generating a magnetic field in the stabilization chamber such that the magnetic field varies in a height direction of the stabilization chamber, wherein the electronic measuring unit is configured for measuring the strength of the magnetic field, wherein the measured magnetic field strength of the magnetic field is a measure of the height within the stabilization chamber at which the float is floating on the milk in the stabilization chamber and whereby hence the measured field strength of the magnetic field is a measure of the flow rate of the milk flow. In this manner, the height at which the float is in the stabilization chamber can be accurately measured. In particular, it holds that a magnetic unit is provided with a permanent magnet. The permanent magnet has as an advantage that it is also insensitive to the environment of the milking parlor. As it has been chosen to arrange the electronic measuring unit in the float instead of the permanent magnet, the float, as mentioned, can be kept light and hence relatively small. Moreover, this way the magnet can be of relatively large design. A large magnet provides that with the aid of the electronic measuring unit measuring can be done in a low-energy manner. Moreover, no, or hardly any, disturbance due to external magnetic fields or even the geomagnetic field occurs. The float can be of exchangeable design so that the electronics can be easily upgraded. In particular, it holds that the electronic measuring unit is provided with a supply. While, as mentioned, the electronic measuring unit can work in a low-energy manner, in this way the float can still be simply replaced when the supply is empty.

In particular, it holds that the electronic measuring unit is furthermore provided with a sensor such as a Hall sensor or a fluxgate sensor for detecting the magnetic field and a processor for processing measuring signals from the Hall sensor to obtain information about the flow rate of the milk flow.

According to a practical variant, it follows that the stabilization chamber is provided with a first outlet opening which is in fluid communication with the outlet so that, in use, milk can flow out of the stabilization chamber to the outlet, with the outlet opening being preferably provided in or adjacent a bottom of the stabilization chamber.

In particular, it holds that the outflow opening of the buffer reservoir has a width that increases in upward direction. This has as a consequence that with an increasing flow rate the milk flow through the outflow opening can easily increase so that a proper division can be obtained between on the one hand a level of the milk in the buffer reservoir and on the other hand the flow rate of the milk flow.

According to a preferred embodiment, it further holds that a bottom of the buffer reservoir and a bottom of the fluid connection are at a higher level than a bottom of the stabilization chamber. The milk flow being distributed by the plate leads to a quiet depositing of the milk flow in the buffer reservoir. This provides the advantage that a stable milk surface is obtained with little "undulation". This in turn provides the advantage that bobbing of the float is counteracted. In particular, the stabilization chamber 6, the buffer reservoir 24, the outflow channel 32 and the fluid connection 36 are of a non-magnetizable material such as plastic or aluminum.

BRIEF DESCRIPTION OF THE DRAWINGS

The invention will be further elucidated on the basis of the drawing, in which:

FIG. 1 consists of FIGS. 1A, 1B, 1C, and 1D

FIG. 2 consists of FIGS. 2A and 2B and FIG. 2A shows a cross section of the milk meter along the line A-A in FIG. 1B;

DETAILED DESCRIPTION OF THE INVENTION

Figure 2A:
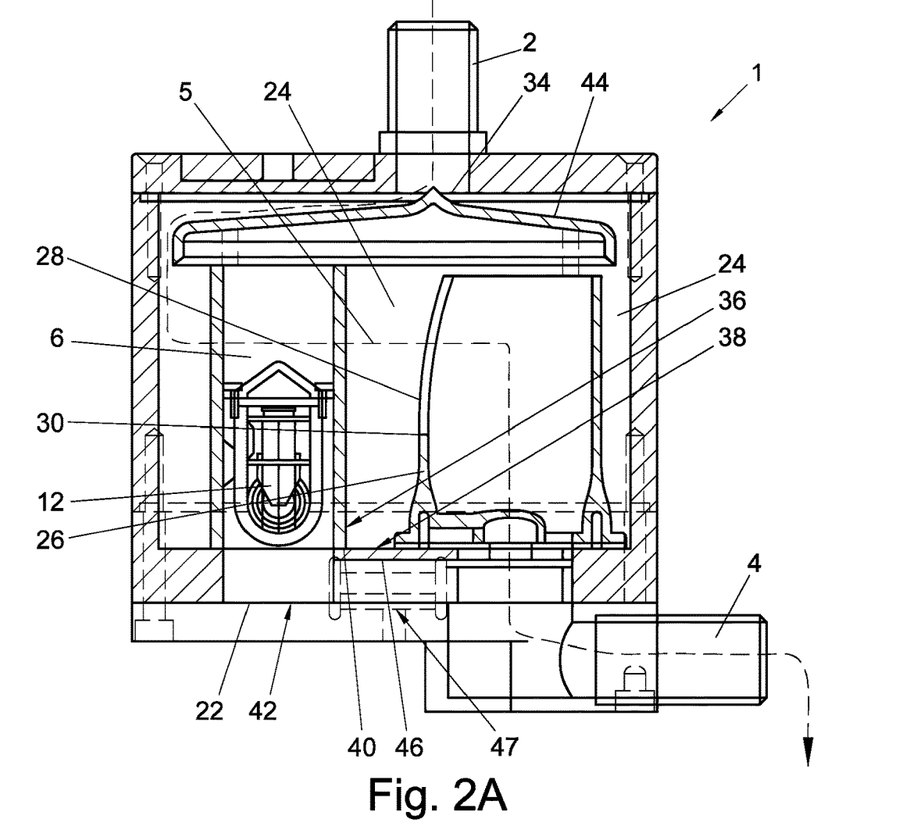

In FIG. 2A, with reference numeral 1 a possible embodiment of a milk meter according to the invention is indicated. The milk meter is provided with an inlet 2 into which, in use, the milk flow whose flow rate is to be measured is supplied. Further, the milk meter is provided with an outlet 4 where the milk flow whose flow rate has been measured, in use, leaves the milk meter again. Between the inlet and the outlet extends a liquid flow path 5, FIG. 2A, which is schematically indicated in the drawing with a broken line. Obviously, the broken line concerns just one possible pathway along which the milk flow can proceed; reason why the representation is schematic.

The milk meter is provided with a stabilization chamber 6 which is included in the liquid flow path 5. The milk meter is furthermore provided with a float 8 which is in the stabilization chamber and which is configured to float on the milk of the milk flow that, in use, is in the stabilization chamber. The milk meter is configured such that a level of the milk in the stabilization chamber (the height of the liquid surface of the milk in the stabilization chamber) depends on the flow rate of the milk flow. In this example, it holds that the height of the level of the milk in the stabilization chamber increases when the flow rate increases.

The milk meter is further provided with a magnetization unit 10 for generating a magnetic field in the stabilization chamber. The magnetic field that is generated is such that the magnetic field strength varies in a height direction h of the stabilization chamber. In the float, an electronic measuring unit 12 is arranged for measuring the strength of the magnetic field. The strength of the magnetic field is also referred to as a magnetic flux. The measured strength of the magnetic field is a measure of the height at which the float is floating on the milk in the stabilization chamber. Because the height at which the float is floating within the stabilization chamber, in turn, is determined by the flow rate of the milk flow, in this way information about the flow rate is obtained. To put it differently, the flow rate is measured in this manner.

Figure 3:
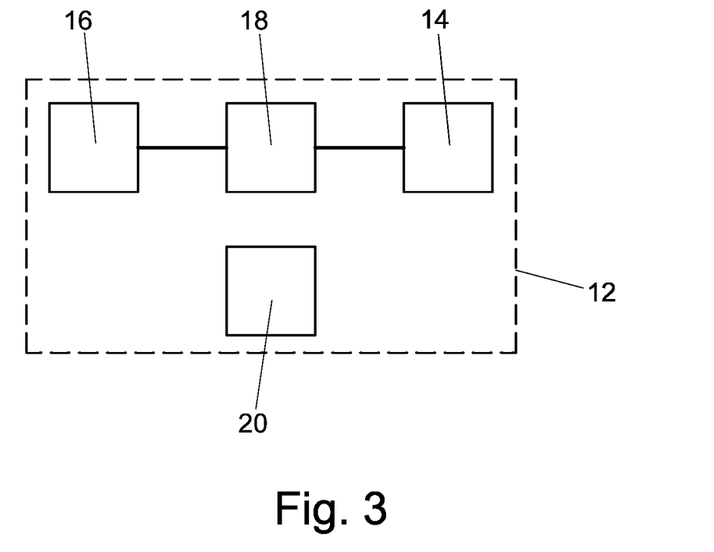
FIG. 3 shows a possible embodiment of the measuring unit of the milk meter of FIG. 1A.

As can be seen in FIG. 3, the electronic measuring unit is provided with a transmitter unit 14 for emitting a signal which comprises information about the measured flow rate of the milk flow. The electronic measuring unit is further provided with a Hall sensor 16 for detecting the magnetic field and a processor 18 for processing measuring signals from the Hall sensor to obtain information about the flow rate of the milk flow, which is emitted with the aid of the transmitter unit 14. The electronic measuring unit 12 is further provided with a supply 20 for providing a supply voltage for the processor and the transmitter unit.

The milk meter in this example is further provided with a buffer reservoir 24 which is included upstream of the stabilization chamber in the liquid flow path 5. Provided in a sidewall 26 of the buffer reservoir is an outflow opening which extends from a lowest point 30 of the outflow opening upwardly in the direction h and which is in fluid communication with the outlet 4. In this example, it holds that the outflow opening 28 is in fluid communication with the outlet 4 via an outflow channel 32. A top of the buffer reservoir is provided with an inlet opening 34 which is in fluid communication with the inlet 2. The buffer reservoir 24 and the stabilization chamber 6 are connected with each other via a fluid connection 36. The construction is such that the buffer reservoir 24, the fluid connection 36 and the stabilization chamber 6, in use, function as communicating vessels so that, in use, a level of the milk in the stabilization chamber (measured in the direction h) is equal to a level of the milk in the buffer reservoir (likewise measured in the direction h).

In this example, it holds that a bottom 38 of the buffer reservoir, and a bottom 40 of the fluid connection 36 are at a greater height than a bottom 42 of the stabilization chamber. The buffer reservoir and the stabilization chamber can be directly or indirectly open to an environment formed in a milking system for milking animals in which the milk meter is included, for instance via small apertures at a top of the buffer reservoir and the stabilization chamber (not shown). This environment of the system typically has a somewhat reduced pressure relative to the atmospheric pressure. This has as a consequence that the buffer reservoir, the stabilization chamber and the fluid connection function as communicating vessels, the vessels being formed by the buffer reservoir and the stabilization chamber. Clearly, in a different application, the buffer reservoir and the stabilization chamber may also be in open communication with an environment outside the milking system and hence with the space in a barn. Also, the buffer reservoir and the stabilization chamber may be in open communication with a space within the milk meter in which the buffer reservoir and the stabilization chamber are included.

Figure 2B:
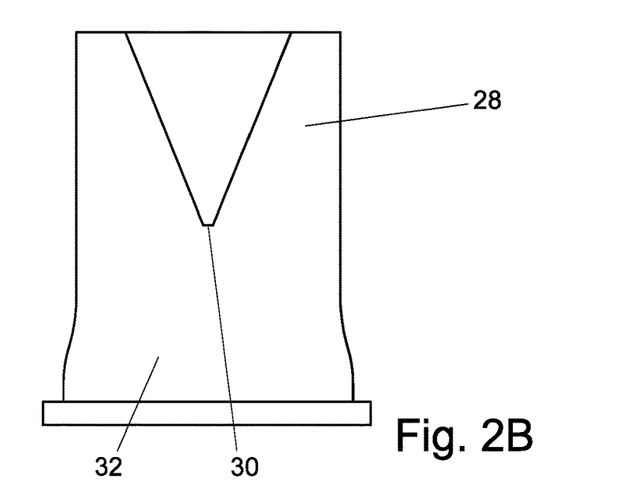
FIG. 2B shows a view of an outflow channel of FIG. 1A.

As can be seen in FIG. 2B, it holds that the outflow opening 28 of the buffer reservoir has a width b which increases in upward direction (in the direction h). The lowest point 30 of the outflow opening is below a half height H of the stabilization chamber. This is merely an example. This point may, if desired, be higher or lower and the point 30 may even be on the bottom 38 of the buffer reservoir.

Figure 1A:
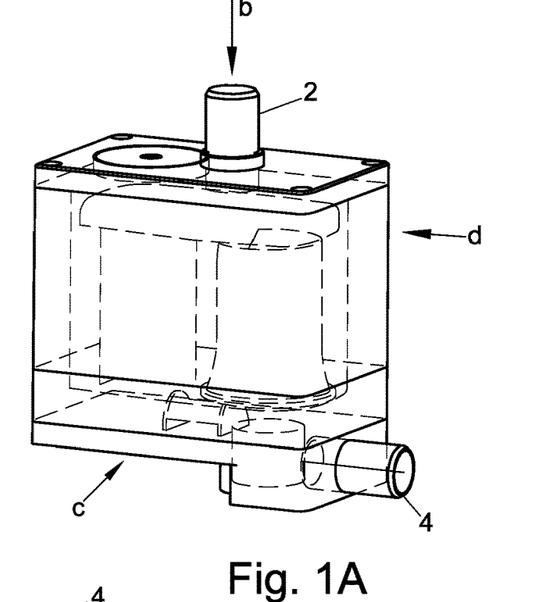
FIG. 1A shows a transparent view of a possible embodiment of the milk meter according to the invention.
Figure 1B:
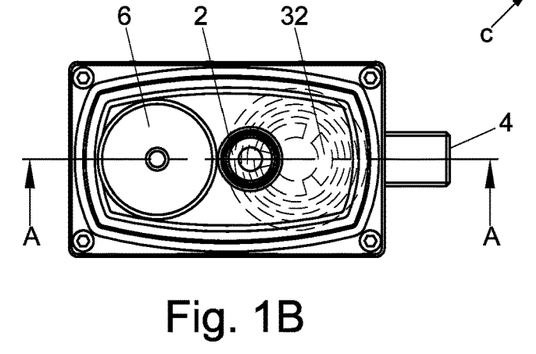
FIG. 1B shows a transparent view of the milk meter according to FIG. 1A in the direction of the arrow b in FIG. 1A according to the invention.
Figure 1C:
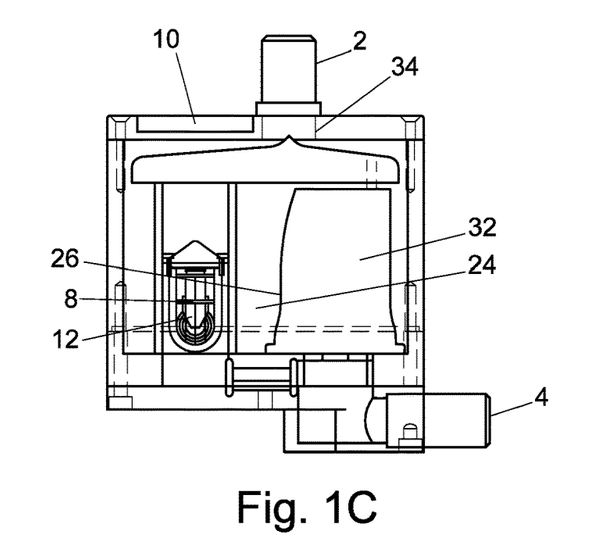
FIG. 1C shows a transparent view of the milk meter according to FIG. 1A in the direction of the arrow c in FIG. 1A according to the invention.
Figure 1D:
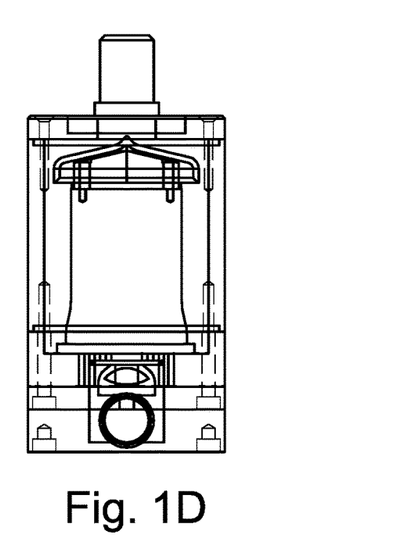
FIG. 1D shows a transparent view of the milk meter according to FIG. 1A in the direction of the arrow d in FIG. 1A according to the invention.

As can be seen in FIG. 1A and FIG. 1B, it holds that the stabilization chamber 6 in this example is of substantially cylinder-shaped design, with the buffer reservoir extending around the stabilization chamber. More particularly, it holds that the buffer reservoir also extends around the outflow channel 32 and that the stabilization chamber 6 is next to the outflow channel 32. The outflow channel in this example is likewise of substantially cylinder-shaped design. However, this is not requisite.

The milk meter is furthermore provided with a milk flow spread plate 44 which is arranged in the liquid flow path 5 between the inlet and the buffer reservoir and is positioned such that the milk flow is distributed by the plate. The magnetization unit is implemented as a permanent magnet which in this example is arranged above the stabilization chamber; more specifically, in this example under the spread plate 44. The magnetic unit may also be arranged in other places, as under the stabilization chamber.

The operation of the milk meter is as follows. When a liquid flow is supplied to the inlet 2, it will first come into contact with the spread plate 44. The milk then flows over the edges of the spread plate into the buffer reservoir 24. This buffer reservoir 24 will start to fill. The stabilization chamber is likewise filled with the milk via the fluid connection 36. The arrangement is such that the level of the milk in the buffer reservoir and in the stabilization chamber is the same. When the level of the milk in the buffer reservoir rises further, the level of the milk will reach the lowest point 30 of the outflow opening 28. As soon as the milk level gets higher, the buffer reservoir will start to empty via the outflow opening 28. During measurement, the level of the milk is thus equal to, or higher than, the lowest point 30. The height of the lowest point 30 is chosen such that during measurement the float will always float properly. The milk flowing out via the outflow opening 28 will flow via the outflow channel 32 to the outlet 4. When the milk level in the milk meter rises further, a larger portion of the outflow opening 28 will be below the milk level. As a result, the magnitude of the flow rate of the milk that flows through the outflow opening 28 will increase. Eventually, an equilibrium will be established between the supply of milk to the buffer reservoir and the amount of milk that leaves the buffer reservoir. This equilibrium is then also associated with a particular height of the level of the milk in the buffer reservoir. This equilibrium and hence the height of the liquid surface of the milk (here also called the level) depends on the magnitude of the flow rate at which the milk is being supplied to the inlet 2. When the flow rate of the milk that is supplied to the inlet 2 increases, there will be a short period of time in which the flow rate through the outflow opening 28 is smaller than the flow rate of the milk through the inlet. The result is that the milk level in the buffer reservoir will rise. The result of this is that the flow rate through the outflow opening 28 will increase (because a larger part of the outflow opening is below the milk level) until an equilibrium is established again between supply and discharge of milk in the buffer reservoir. When the flow rate of the milk that is supplied to the inlet 2 decreases, there will be a short period of time in which the flow rate of the milk that flows through the outflow opening 28 is greater than the flow rate of the milk that flows through the inlet. The consequence is that the milk level in the buffer reservoir will fall, as a result of which the flow rate through the outflow opening will decrease (in that a smaller part of the outflow opening is below the level of the milk (the milk surface) in the buffer reservoir) until an equilibrium is established again between supply and discharge of milk in the buffer reservoir. The milk level in the stabilization chamber (the height of the liquid surface of the milk in the stabilization chamber) will follow the milk level of the buffer reservoir. The measured strength of the magnetic field will hence be a measure of the height at which the float is floating on the milk in the stabilization chamber. Because the height at which the float is floating within the stabilization chamber, in turn, is determined by the flow rate of the milk flow, in this manner information about the flow rate is obtained. To put it differently, the flow rate is measured in this manner.

In particular, the buffer reservoir and the stabilization chamber are each further provided with a relatively small outlet opening 22 and 46 which have no influence on the measurement because through these openings only a relatively small portion of the milk can flow out of the buffer reservoir and the stabilization chamber, respectively. These openings, so-called drainage openings, are provided to ensure that after use the stabilization chamber and the buffer reservoir can slowly empty via the outlet 4. These openings may also each be provided with an openable and closable valve unit. The valve unit of the opening 46 is indicated by way of example in FIG. 2A with reference numeral 47. The float is of exchangeable design, so that it can be replaced when the supply is empty or when the electronics is to be updated.

Figure 4:
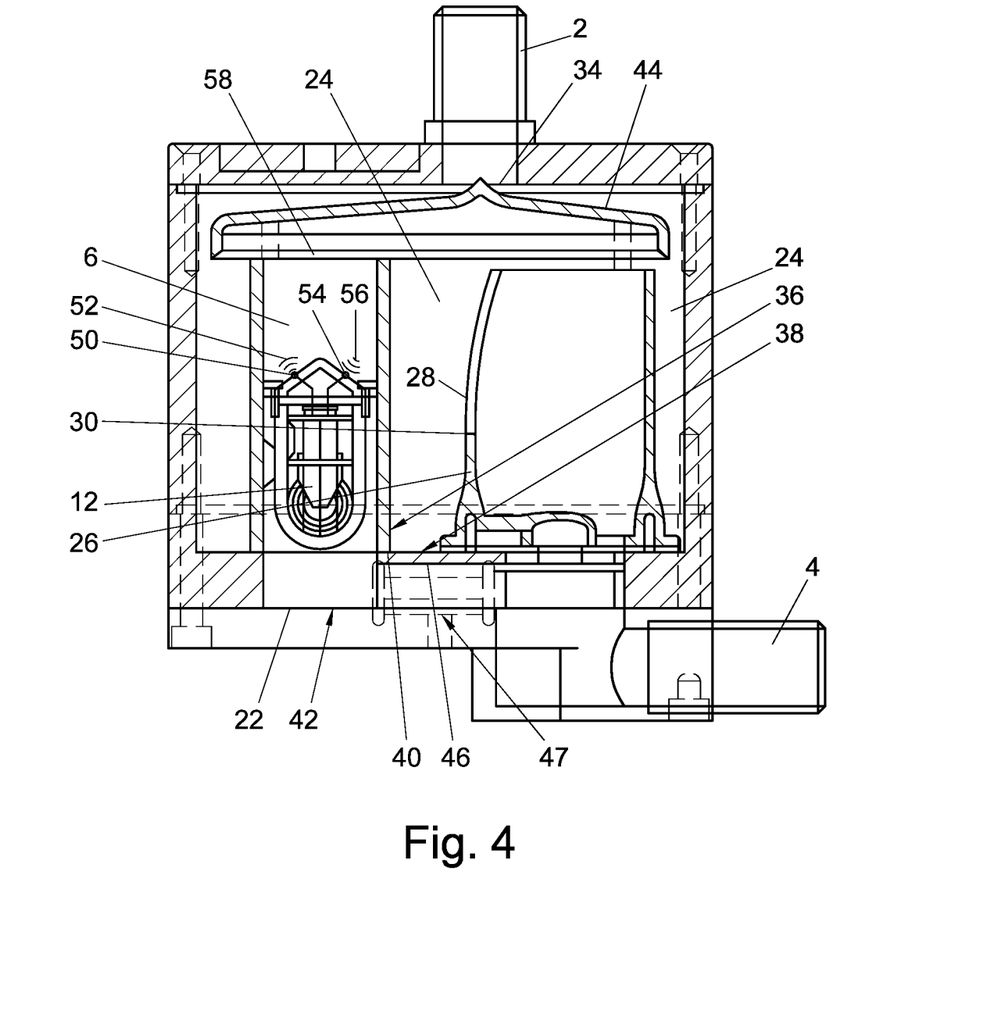
FIG. 4 shows a cross section of an alternative embodiment of a milk meter according to the invention.
Figure 5:
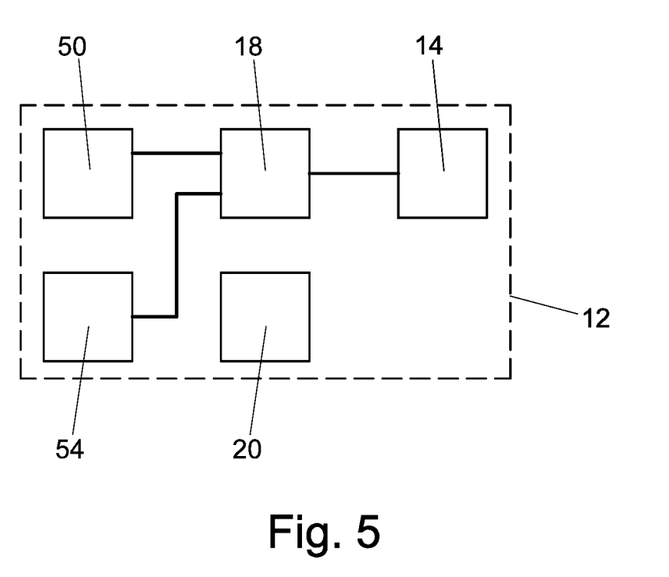
FIG. 5 shows a possible embodiment of the measuring unit of the milk meter of FIG. 4.
Figure 6:
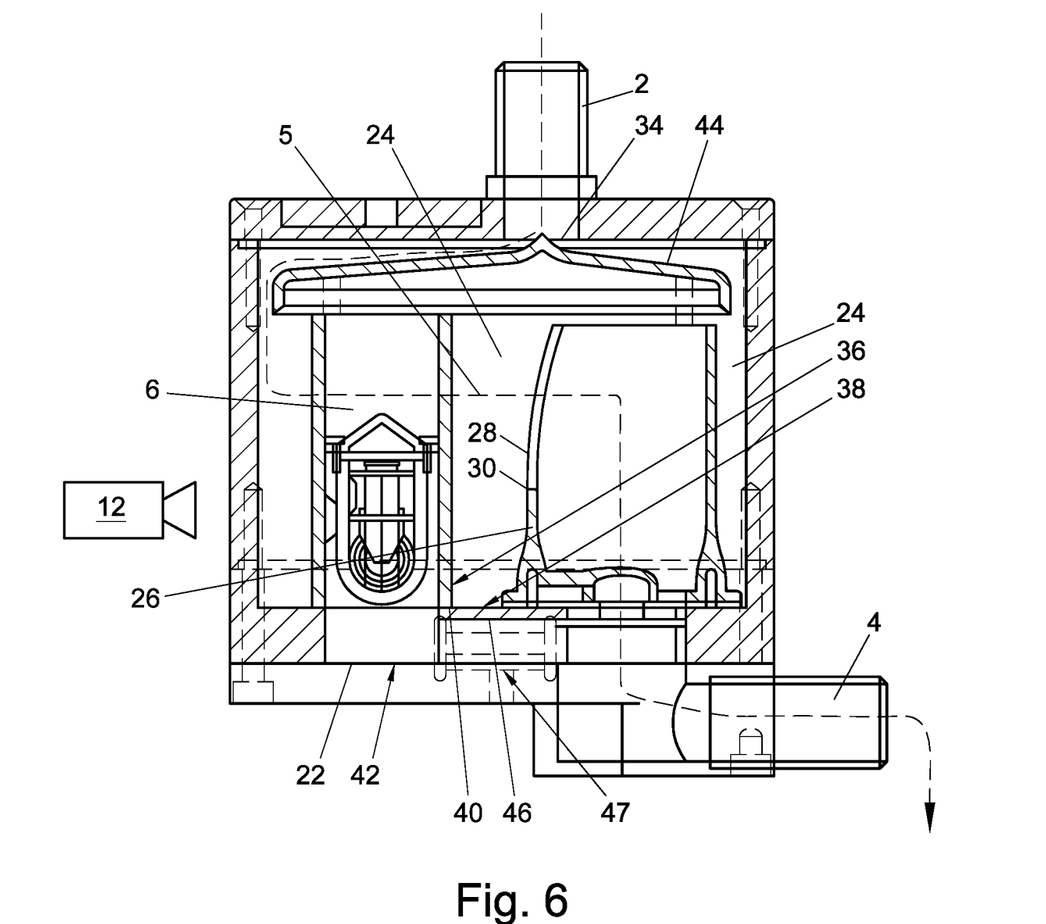
FIG. 6 shows the milk meter of FIG. 1A provided with an alternative sensor device.

The invention is not in any way limited to the above-outlined embodiment. Thus, the stabilization chamber and/ or the outflow channel may for instance each have the shape of a rectangular bar instead of a cylinder. The float can then likewise be of rectangular design. In this example, the stabilization chamber 6, the buffer reservoir 24, the outflow channel 32 and the fluid connection 36 are of a plastic. This provides the advantage that these parts do not influence the magnetic field. Also, the electronic measuring unit may be provided with other means than described above for contactlessly measuring the height within the stabilization chamber at which the float is floating on the milk in the stabilization chamber so that the measured height is a measure of the flow rate of the milk flow. Such a variant is shown in FIGS. 4 and 5, where parts corresponding to preceding figures are provided with the same reference numerals. The electronic measuring unit 12 is provided with a transmitter 50 for emitting up in an upward direction a pulsating electromagnetic or acoustic measuring signal 52, a receiver 54 for receiving reflections 66 of the measuring signal on a part 58 of the milk meter that is fixed relative to the stabilization chamber. The processor 18 is configured to determine the time difference between the emission and reception of a pulse of the measuring signal, whereby the time difference is a measure of the height within the stabilization chamber at which the float is floating on the milk in the stabilization chamber and whereby hence the measured time lapse is a measure of the flow rate of the milk flow. With the aid of the transmitter unit 14, again information about the flow rate of the milk flow is emitted. Other variants are also conceivable. For instance, an inner wall of the stabilization chamber may be provided with optical, mutually different markings which are separated from each other in upward direction. With an optical sensor of the measuring unit 12 which has a horizontal viewing direction, in each case, depending on the height at which the float is in the stabilization chamber, at least one defined marking can be detected. By determining which marking or markings are detected with the sensor, the height at which the float is within the stabilization chamber can be determined. The detected height is then a measure of the flow rate of the milk flow. Information about the flow rate of the milk flow can again be emitted with the transmitter unit 14. Such variants are each understood to fall within the framework of the invention. Also, the sensor device may be arranged outside the float (see FIG. 6 where mutually corresponding parts in FIGS. 1A-2B on the one hand and FIG. 6 on the other are provided with the same reference numerals). The sensor device may, for example, be outside the stabilization chamber and be configured to measure the height of the level of the milk in the stabilization chamber, with the measured height of the level of the milk being a measure of the flow rate of the milk flow. The sensor device may then be provided, for example, with at least one sensor, such as an optical sensor, to measure the height of the level of the milk. The walls of the stabilization chamber may be transparent for this purpose. Also, the sensor device which is arranged, for example, outside the stabilization chamber may be configured to measure the height at which the float is floating on the milk in the stabilization chamber, with the measured height of the float being a measure of the flow rate of the milk flow. The sensor device may then be provided, for example, with at least one sensor, such as an optical sensor, to measure the height at which the float is within the stabilization chamber. The walls of the stabilization chamber may again be transparent for this purpose.

The invention claimed is:

1. A milk meter for measuring a flow rate of a milk flow, provided with an inlet to which the milk flow is supplied, an outlet where the milk flow leaves the milk meter, and a liquid flow path extending from the inlet to the outlet, wherein the milk meter is provided with a stabilization chamber which is included in the liquid flow path and a float which is in the stabilization chamber and is configured to float on the milk of the milk flow that is in the stabilization chamber, the milk meter is configured such that a level of milk in the stabilization chamber depends on the flow rate of the milk flow, the milk meter is provided with a buffer reservoir which is included upstream of the stabilization chamber in the liquid flow path, in a sidewall of the buffer reservoir an outflow opening is provided which extends from a lowest point of the outflow opening upwardly and is in fluid communication with the outlet, a top of the buffer reservoir comprises an inlet opening which is in fluid communication with the inlet, and the buffer reservoir and the stabilization chamber are connected with each other via a fluid connection, such that the buffer reservoir, the fluid connection and the stabilization chamber, function as communicating vessels so that, the level of the milk in the stabilization chamber is equal to a level of the milk in the buffer reservoir, the milk meter is furthermore provided with at least one sensor device for determining the flow rate of the milk flow through the milk meter, the milk meter is further provided with an outflow channel, the outflow opening is in fluid communication with the outlet via the outflow channel, and the outflow channel is in the milk meter next to the stabilization chamber.

2. The milk meter according to claim 1, wherein that outflow channel and the stabilization chamber are in the buffer reservoir together, the buffer reservoir extends around the stabilization chamber and the buffer reservoir extends around the outflow channel.

3. The milk meter according to claim 1, wherein the outflow channel and the stabilization chamber are separated at a distance from each other.

4. The milk meter according to claim 3, wherein the distance extends in a direction of a liquid surface of the milk that is in the buffer reservoir in a horizontal direction.

5. The milk meter according to claim 1, wherein the outflow opening of the buffer reservoir has a width that increase in an upward direction.

6. The milk meter according to claim 1, wherein the lowest point of the outflow opening is below a half height of the stabilization chamber.

7. The milk meter according to claim 6, wherein the lowest point of the outflow opening is at a height higher than the lowest point of the stabilization chamber.

8. The milk meter according to claim 1, wherein a bottom of the stabilization chamber is at a lower level than a bottom of the buffer reservoir or a bottom of the fluid connection.

9. The milk meter according to claim 1, wherein the milk meter is provided with a milk flow spread plate which is arranged in the liquid flow path between the inlet and the buffer reservoir and is positioned such that the milk flow is distributed by the plate.

10. The milk meter according to claim 1, wherein the stabilization chamber is provided with a first outlet opening which is in fluid communication with the outlet so that milk can flow out of the stabilization chamber to the outlet, the outlet opening is provided in a bottom of the stabilization chamber and a valve unit is arranged in the first outlet opening.

11. The milk meter according to claim 1, wherein the sensor device is configured to measure the height of the level of the milk in the stabilization chamber, the measured height of the level of the milk is a measure of the flow rate of the milk flow, the sensor device is provided with at least one optical sensor to measure the height of the level of the milk in the stabilization chamber, the at least one sensor is outside the stabilization chamber or the sensor device is configured to measure the height at which the float is floating on the milk in the stabilization chamber, the measured height of the float is a measure of the flow rate of the milk flow, the sensor device is provided with at least one optical sensor to measure the height at which the float is within the stabilization chamber, the at least one sensor is outside the stabilization chamber.

12. The milk meter according to claim 1, wherein the sensor device is arranged in or on the float, the sensor device comprises an electronic measuring unit for contactlessly measuring the height within the stabilization chamber at which the float is floating on the milk in the stabilization chamber so that the measured height is a measure of the flow rate of the milk flow, and the electronic measuring unit is provided with a transmitter unit for wirelessly emitting a signal which comprises information about the measured flow rate of the milk flow.

13. The milk meter according to claim 12, wherein the milk meter is furthermore provided with a magnetic unit for generating a magnetic field in the stabilization chamber such that the magnetic field varies in a height direction of the stabilization chamber, the electronic measuring unit is configured for measuring the strength of the magnetic field, the measured magnetic field strength of the magnetic field is a measure of the height within the stabilization chamber at which the float is floating on the milk in the stabilization chamber and hence the measured field strength of the magnetic field is a measure of the flow rate of the milk flow.

14. The milk meter according to claim 13, wherein the electronic measuring unit is furthermore provided with a Hall sensor for detecting the magnetic field and a processor for processing measuring signals from the sensor to obtain information about the flow rate of the milk flow.

15. The milk meter according to claim 12, wherein the electronic measuring unit is provided with a transmitter for emitting up in an upward direction a pulsating electromagnetic or acoustic measuring signal, a receiver for receiving reflection of the measuring signal on a part of the milk meter that is fixed relative to the stabilization chamber, and a processor for determining the time difference between the emission and reception of a pulse of the measuring signal, wherein the time difference is a measure of the height within the stabilization chamber at which the float is floating on the milk in the stabilization chamber and hence the measured time lapse is a measure of the flow rate of the milk flow.

16. The milk meter according to claim 12, wherein the electronic measuring unit is further provided with a supply for providing a supply voltage for the operation of the electronic measuring unit.

17. The milk meter according to claim 13, wherein the magnetic unit is arranged above or under the stabilization chamber.

18. The milk meter according to claim 13, wherein the milk meter is provided with a milk flow spread plate which is arranged in the liquid flow path between the inlet and the buffer reservoir and is positioned such that the milk flow is distributed by the milk flow spread plate, and the magnetic unit is positioned under the milk flow spread plate.

19. The milk meter according to claim 13, wherein the magnetic unit comprise a permanent magnet.

20. The milk meter according to claim 1, wherein the float is of exchangeable design.

21. The milk meter according to claim 1, wherein the outflow channel is provided with a bottom provided with an outlet opening via which the milk can flow to the outlet of the milk meter and outlet opening a valve unit is arranged.

\* \* \* \* \*